(12) United States Patent  
Buchanan et al.

(10) Patent No.: US 8,300,377 B2
(45) Date of Patent: Oct. 30, 2012

(54) SWELL SUSTAINING TRANSIENT VOLTAGE SURGE SUPPRESSOR

(75) Inventors: Daniel Buchanan, Vestal, NY (US); Walter Schilloff, Endicott, NY (US); Glenn Wilson, Endicott, NY (US)

(73) Assignee: Emerson Electric Co., St. Louis, MO (US)

( * ) Notice: Subject to any disclaimer, the term of this patent is extended or adjusted under 35 U.S.C. 154(b) by 562 days.

(21) Appl. No.: 12/512,749

(22) Filed: Jul. 30, 2009

(65) Prior Publication Data

US 2011/0026182 A1 Feb. 3, 2011

(51) Int. Cl.
    *H02H 9/00* (2006.01)
(52) U.S. Cl. ......................................... 361/111
(58) Field of Classification Search .............. 361/111, 361/56
    See application file for complete search history.

(56) References Cited

U.S. PATENT DOCUMENTS

| 4,584,622 | A | 4/1986 | Crosby et al. |
| 4,628,394 | A | 12/1986 | Crosby et al. |
| 5,488,534 | A | 1/1996 | Rau et al. |
| 6,118,639 | A | 9/2000 | Goldstein |
| 6,226,162 | B1 * | 5/2001 | Kladar et al. ................. 361/56 |
| 6,304,188 | B1 | 10/2001 | Subak et al. |
| 6,748,077 | B2 * | 6/2004 | Ford ............................ 379/412 |
| 7,957,117 | B2 * | 6/2011 | Divan .......................... 361/118 |

* cited by examiner

*Primary Examiner* — Stephen W Jackson

(74) *Attorney, Agent, or Firm* — Locke Lord LLP

(57) ABSTRACT

A transient voltage surge suppressor assembly comprising: a first energy absorbing device; a second energy absorbing device in parallel with the first device; and a voltage sense circuit configured to take the first device off-line when a voltage swell lasts for a duration. The first and second devices may be wired in parallel between a line and a neutral. The assembly may include a third energy absorbing device wired between the line and a ground, the third device also being configured to be taken off-line when the voltage swell lasts for the duration. The voltage sense circuit may be powered by a line voltage or a lower supply voltage. The first device may be more sensitive than the second device. For example, the first device may have a lower clamping voltage than the second device. The first device may be smaller and/or include fewer components than the second device.

30 Claims, 9 Drawing Sheets

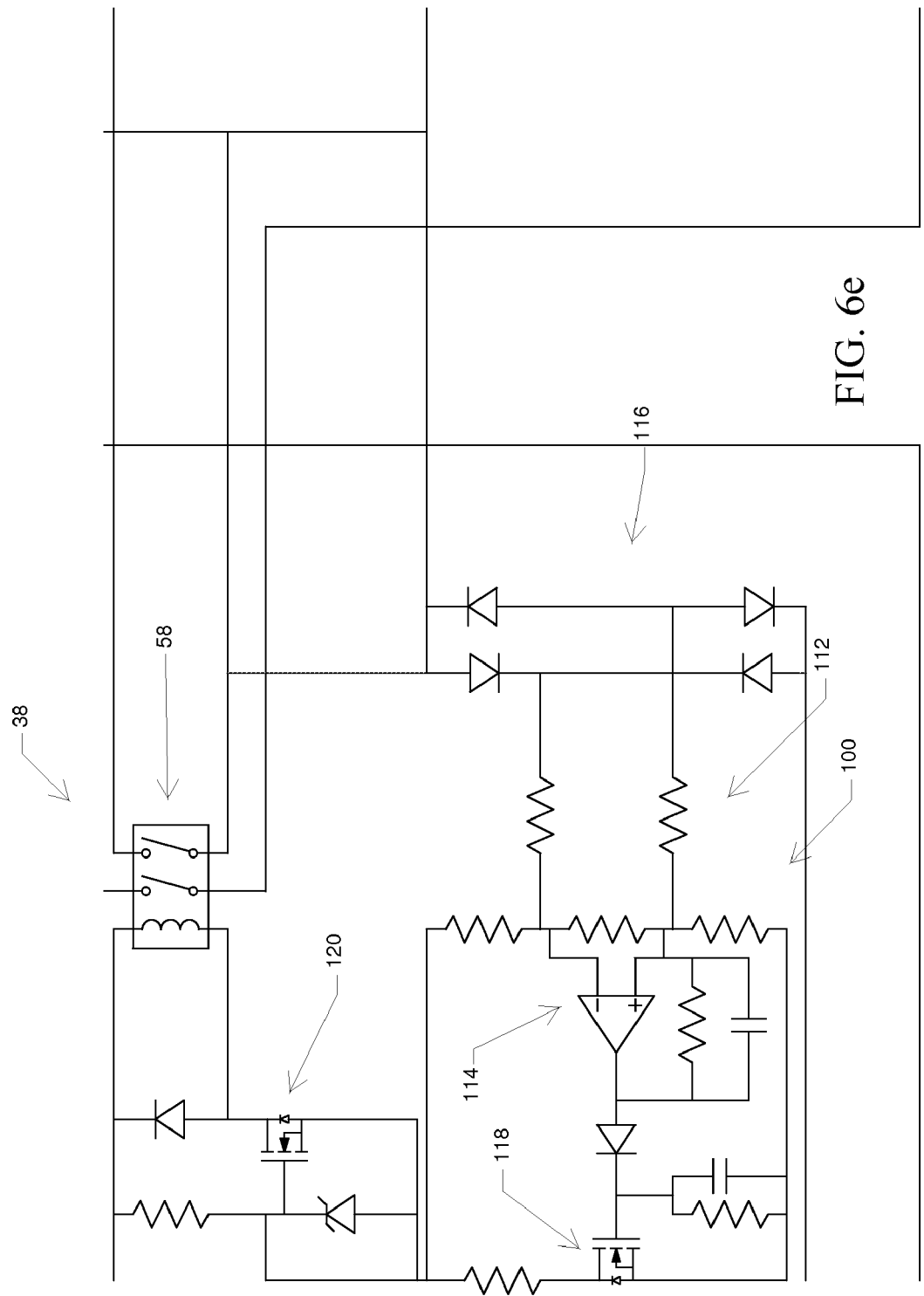

SWELL SUSTAINING TRANSIENT VOLTAGE SURGE SUPPRESSOR

CROSS REFERENCE TO RELATED APPLICATIONS

None.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to surge suppressors; and more specifically relate to circuitry for transient voltage surge suppressors.

2. Description of the Related Art

U.S. Pat. No. 4,584,622 discloses a "transient voltage surge suppressor for an AC powerline comprises two semiconductor voltage limiting devices before a low pass LC filter and a third semiconductor voltage limiting device after the filter. The suppressor can be plugged into a 120 volt receptacle for protection of sensitive electronic equipment."

U.S. Pat. No. 4,628,394 discloses a "transient voltage surge suppressor for an AC powerline comprises two semiconductor voltage limiting devices before a low pass LC filter and a third semiconductor voltage limiting device after the filter. The suppressor can be plugged into a 120 volt receptacle for protection of sensitive electronic equipment."

U.S. Pat. No. 5,488,534 discloses a "transient voltage surge suppressor (100) for use in a single or poly-phase power distribution network to protect equipment supplied power from the network from damage caused by line surges or transients. A plurality of surge suppression assemblies (102A-102G) each of which includes a plurality of semiconductors (114) connected in parallel and a fuse wire (118) connected in series with each semiconductor. Each assembly is mounted on a separate circuit board (126A-126G). A fault detection circuit (104) in each assembly includes both a sensor (132A-132G) for sensing when a semiconductor in one of the surge suppression assemblies fails, or when a fuse wire in one of the assemblies clears, and a circuit (152) for providing a visual indication thereof. The fault detector is mounted on a separate circuit board (131). The respective circuit boards are installed in a module (120) with the one set of circuit boards on which the surge suppression assemblies are mounted being installed in one plane, and the circuit board on which the fault detector is mounted being installed perpendicular to them. A plasma suppression medium includes a sand and epoxy material for preventing spread of a plasma produced when a semiconductor fails or a fuse wire clears. The sand and epoxy material fill the module including the spaces between the circuit boards to prevent the spread of any plasma created due to semiconductor failure or fuse wire clearing."

U.S. Pat. No. 6,118,639 discloses a "fast acting disconnect system is incorporated with a transient voltage surge suppressor to protect the surge suppressor and the connected utilization equipment from power frequency overvoltages. A resettable circuit breaker permits reconnection after disconnecting the AC voltage source due to a power frequency overvoltage. The system is applicable to protect equipment connected to an AC source of voltage that has a phase conductor, a neutral conductor and a grounding conductor with surge suppressors connected to protect against transient voltage surges from phase-to-neutral, phase-to-ground and neutral-to-ground. The system protects against damage of the surge suppressor and the connected equipment from power frequency overvoltages as specified for testing by a recognized testing agency. A transient voltage surge of the greatest magnitude anticipated in the environment for which the system is designed will not cause a false disconnect operation. The system will respond to a power frequency overvoltage under conditions in which it is not energized prior to the application of the overvoltage."

U.S. Pat. No. 6,304,188 discloses a "modular surge suppression system for a traffic cabinet. The system comprising a surge suppression module and a modular adapter connected to the circuitry in the traffic cabinet. The modular adapter being configured to connect with the surge suppression module."

The inventions disclosed and taught herein are directed to an improved transient voltage surge suppressor.

BRIEF SUMMARY OF THE INVENTION

In one embodiment, the present invention includes a transient voltage surge suppressor assembly comprising: a first energy absorbing device; a second energy absorbing device in parallel with the first device; and a voltage sense circuit configured to take the first device off-line when a voltage swell lasts for a duration. The assembly may also include a relay in series with the first device and opened by the voltage sense circuit when the voltage swell lasts for the duration. The assembly may also include a resistive and/or capacitive element in series with the first device. The first and second devices may be wired in parallel between a line and a neutral, between the line and a ground, or between two different lines. Alternatively, the first and second devices may be wired in parallel between the line and the neutral, with a third energy absorbing device wired between the line and the ground, the third device also being configured to be taken off-line when the voltage swell lasts for the duration. The voltage sense circuit may be powered by a line voltage between the line and the neutral. Alternatively, the voltage sense circuit may be powered by a supply voltage less than the line voltage, such as 5 volts, 12 volts, 15 volts, or 48 volts. The voltage sense circuit may be further configured to place the first device on-line after the voltage swell subsides. The first device may be more sensitive than the second device. For example, the first device may have a lower clamping voltage than the second device. The first device may be smaller than the second device. The first device may include fewer components than the second device.

In another embodiment, the present invention includes a transient voltage surge suppressor assembly comprising: a first energy absorbing device; a capacitive element wired in series with the first device, wherein the first device and the capacitive element are wired between a line and a neutral; a pair of relay contacts wired across the capacitive element, wherein the relay contacts form a portion of a relay normally shorting the capacitive element, the relay being configured to create an open circuit across the capacitive element thereby taking the first device off-line; a second energy absorbing device wired between the line and the neutral in parallel with the first device, the second device having a higher clamping voltage than the first device; and a voltage sense circuit configured to detect a voltage swell and cause the relay to take the first device off-line when the voltage swell lasts for a duration. The assembly may further comprise a third energy absorbing device wired between the line and a ground, the third device also being configured to be taken off-line if the voltage swell lasts for the duration. The voltage sense circuit may be powered by a line voltage between the line and the neutral. Alternatively, the voltage sense circuit may be powered by a supply voltage less than the line voltage. The voltage sense circuit may be further configured to place the first device on-line after the voltage swell subsides.

In another embodiment, the present invention includes a transient voltage surge suppressor assembly comprising: a first energy absorbing device; a first capacitive element wired in series with the first device, wherein the first device and the first capacitive element are wired between a line and a neutral; a first pair of relay contacts wired across the first capacitive element, wherein the first relay contacts form a portion of a first relay, the first relay being configured to create a short circuit across the first capacitive element thereby placing the first device on-line, the first relay being further configured to create an open circuit across the first capacitive element thereby taking the first device off-line; a second energy absorbing device connected to the line; a second capacitive element wired in series with the second device, wherein the first device and the second capacitive element are wired between the line and a ground; a second pair of relay contacts wired across the second capacitive element, wherein the second relay contacts form a portion of a second relay, the second relay being configured to create a short circuit across the second capacitive element thereby placing the second device on-line, the second relay being further configured to create an open circuit across the second capacitive element thereby taking the second device off-line; a third energy absorbing device wired between the line and the neutral in parallel with the first device, the third device having a higher clamping voltage than the first device; a voltage sense circuit configured to detect a voltage swell and take the first and second devices off-line when the voltage swell lasts for a duration and place the first and second devices on-line in the absence of the voltage swell.

BRIEF DESCRIPTION OF THE SEVERAL VIEWS OF THE DRAWINGS

FIG. 6b illustrates a first close-up partial view of the circuit of FIG. 6a;

FIG. 6c illustrates a second close-up partial view of the circuit of FIG. 6a;

FIG. 6d illustrates a third close-up partial view of the circuit of FIG. 6a;

FIG. 6e illustrates a fourth close-up partial view of the circuit of FIG. 6a.

DETAILED DESCRIPTION

Figure 1:
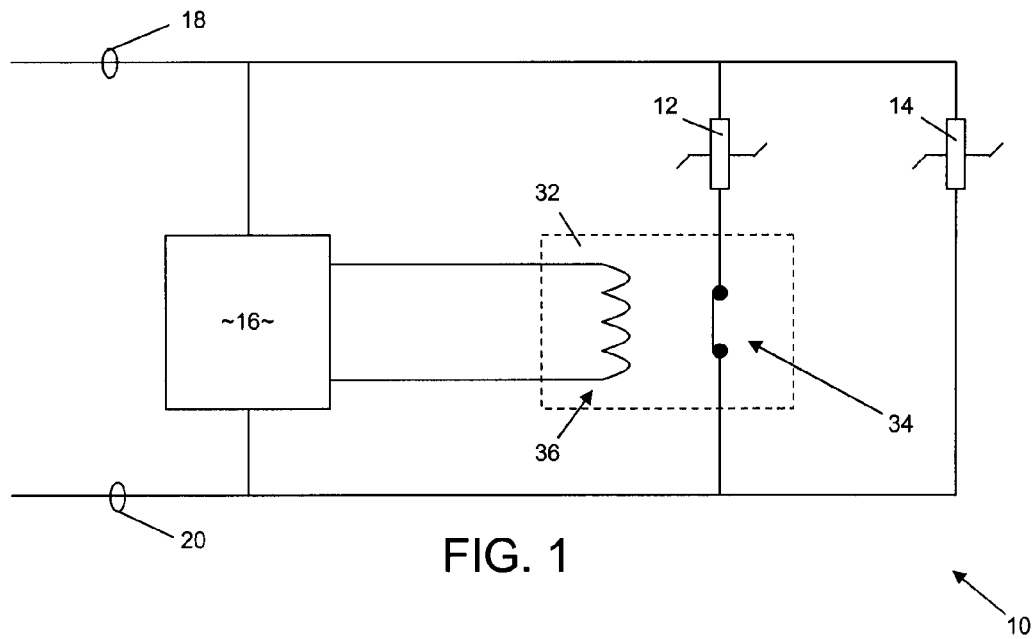
FIG. 1 illustrates a particular embodiment of a transient voltage surge suppressor assembly utilizing certain aspects of the present inventions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a transient voltage surge suppressor assembly comprising: a first energy absorbing device; a second energy absorbing device in parallel with the first device; and a voltage sense circuit configured to take the first device off-line when a voltage swell lasts for a duration. The assembly may also include a relay in series with the first device and opened by the voltage sense circuit when the voltage swell lasts for the duration. The assembly may also include a resistance or capacitive element in series with the first device. The first and second devices may be wired in parallel between a line and a neutral, or between the line and a ground. Alternatively, the first and second devices may be wired in parallel between the line and the neutral with include a third energy absorbing device wired between the line and a ground, the third device also being configured to be taken off-line when the voltage swell lasts for the duration. The voltage sense circuit may be powered by a line voltage between the line and the neutral. Alternatively, the voltage sense circuit may be powered by a supply voltage less than the line voltage, such as 5 volts, 12 volts, 15 volts, or 48 volts. The voltage sense circuit may be further configured to place the first device on-line after the voltage swell subsides. The first device may be more sensitive than the second device. For example, the first device may have a lower clamping voltage than the second device. The first device may be smaller than the second device. The first device may include fewer components than the second device.

FIG. 1 is an illustration of a transient voltage surge suppressor assembly, or circuit, 10 utilizing certain aspects of the present inventions. The circuit includes a first energy absorbing device 12, a second energy absorbing device 14 in parallel with the first device 12, and a voltage, and/or power, sense circuit 16 configured to take the first device 12 off-line when a voltage swell lasts for a duration. The energy absorbing devices 12,14 may be metal oxide varistors (MOVs), silicon avalanche diodes (SADs), or some other energy absorbing component to control an over-voltage, or a voltage swell. The first device 12 may be more sensitive, faster acting, have a lower clamping voltage, and/or include fewer/smaller components than the second device 14.

The duration may be predetermined. For example, the duration may be set regardless of fault current and/or voltage. Alternatively, the duration may be calculated and/or selected in real-time, or near real-time, according to the fault current and/or voltage. For example, the duration may be calculated in order to take the first device 12 off-line once the first device 12 has absorbed its energy absorbing limit. As such, the duration may be determined in real-time, or near real-time.

In still other embodiments, the duration may be selected from a set of durations, according to the fault current and/or voltage, in an effort to take the first device 12 off-line once the first device 12 has absorbed its energy absorbing limit. For example, a shorter duration may be selected when the fault current and/or voltage is greater and/or a longer duration may be selected when the fault current and/or voltage is less.

Figure 2:
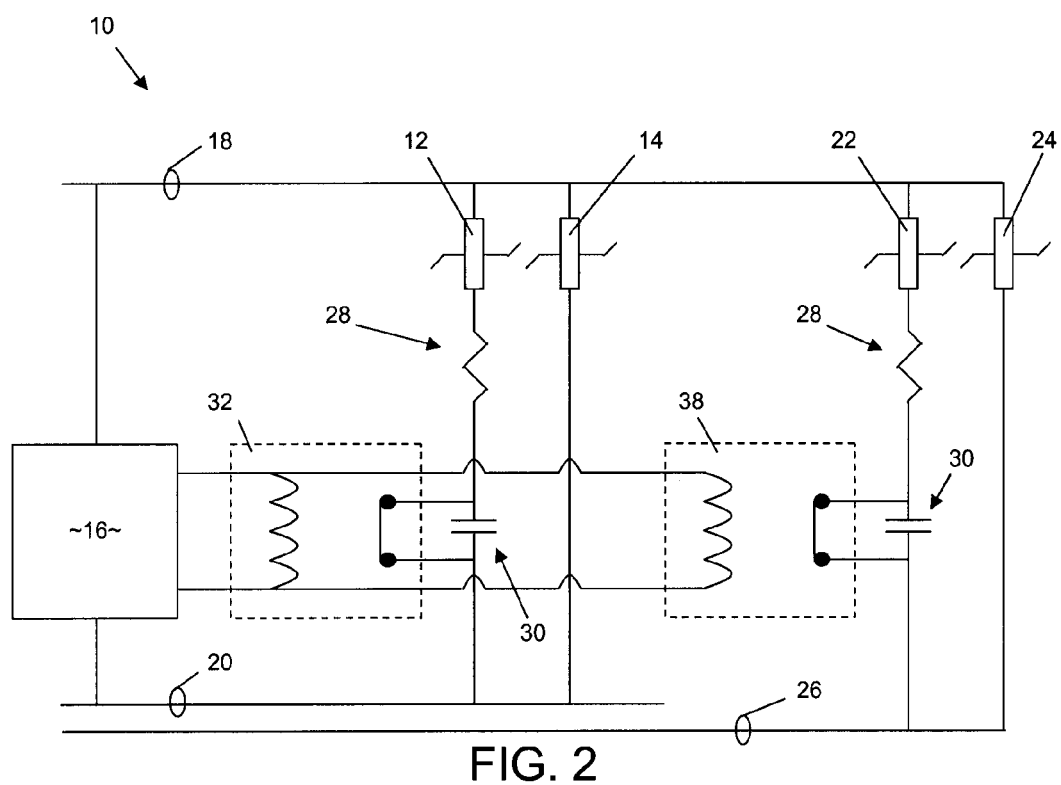
FIG. 2 illustrates another embodiment of the transient voltage surge suppressor assembly utilizing certain aspects of the present inventions.

In one embodiment, the first and second devices 12,14 are wired in parallel between a line 18 and a neutral 20. In another embodiment, the first and second devices 12,14 are wired in parallel between the line 18 and a ground (not shown in FIG. 1). In still another embodiment, referring also to FIG. 2, the first and second devices 12,14 are wired in parallel between the line 18 and the neutral 20, with a third energy absorbing device 22 and/or fourth energy absorbing device 24 wired in parallel between the line 18 and a ground 26. It can be seen that the third and fourth devices 22,24, where used, are preferably configured similarly to the first and second devices 12,14, respectively. In still another embodiment, the first and second devices 12,14 are wired in parallel between the line 18 and a second line (not shown), such as in a multi-phase system.

The assembly 10 may also include a resistive element, such as a resistor, 28 in series with the first and/or third device 12,22. The resistor 28 would preferably be of a relatively low resistance and used primarily to limit the current through the first and/or third device 12,22 during a transient voltage surge, such that lower currents flow through the first device 12. As the current increases, the resistive element 28 resists current flow, thereby spilling over current flow through the second device 14. Thus, while the first device 12 may have a lower voltage rating and lower conduction point, portions of large fault currents may flow through both the first and second devices 12,14 for a period of time. For example, when the fault current is relatively low, such as around 500 amps (A), the first device 12 may dissipate that energy, with little or no fault current flowing through the second device 14. With larger fault currents, such as 3-10 kA, both the first and second devices 12,14 may be used to dissipate that energy.

The assembly 10 may also include a capacitive, or reactive, element, such as a capacitor, 30 in series with the first and/or third device 12,22. The capacitor 30 would preferably carry the current through the first and/or third device 12,22 momentarily, when the device 12,22 is taken off-line as will be discussed in greater detail below, to prevent excessive arcing.

In another embodiment, the resistor 28 and capacitor 30 are combined into a single impedance element.

The assembly 10 may also include a relay 32 in series with the first device 12. As will be discussed in greater detail below, the relay 32 may be opened by the voltage sense circuit 16 when the voltage swell lasts for the duration. The relay 32 preferably comprises a set of contacts 34 controlled by a coil 36. During normal operation, the contacts 34 are preferably closed allowing current. Thus, the relay 32 is preferably either a normally closed (NC) relay or may be a normally open (NO) relay with the coil 36 energized during normal operation. The assembly 10 may also include another similarly configured relay 38 in series with the third device 22.

In one embodiment, the relay 32,38 provides a short circuit across the capacitor 30, thereby placing the first and/or third device 12,22 on-line, during normal operation. In an abnormal condition, such as a long duration voltage swell, the contacts 34 of the relay 32,38 may be opened, creating an open circuit across the capacitor 30, thereby forcing fault current to flow through the capacitor 30 until the capacitor 30 is charged and current flow stops, taking the first and/or third device 12,22 off-line.

As will be discussed in greater detail below, the voltage sense circuit 16 controls the relay 32,38. Thus, the voltage sense circuit 16 is configured to take the first and/or third devices 12,22 off-line, such as when the voltage swell last for the duration. The voltage sense circuit 16 may also be configured to place the first and/or third device 12,22 on-line after the voltage swell subsides. The voltage sense circuit 16 may trigger both relays 32,38 using the same control signal, such as with the coils 36 wired in parallel. Alternatively, the voltage sense circuit 16 may trigger each relay 32,38 using separate control signals.

The voltage sense circuit 16 may be powered by a line voltage between the line 18 and the neutral 20 or between the line 18 and the ground 26. Alternatively, the voltage sense circuit 16 may be powered by a supply voltage less than the line voltage, such as 5 volts, 12 volts, 15 volts, or 48 volts.

Figure 3:
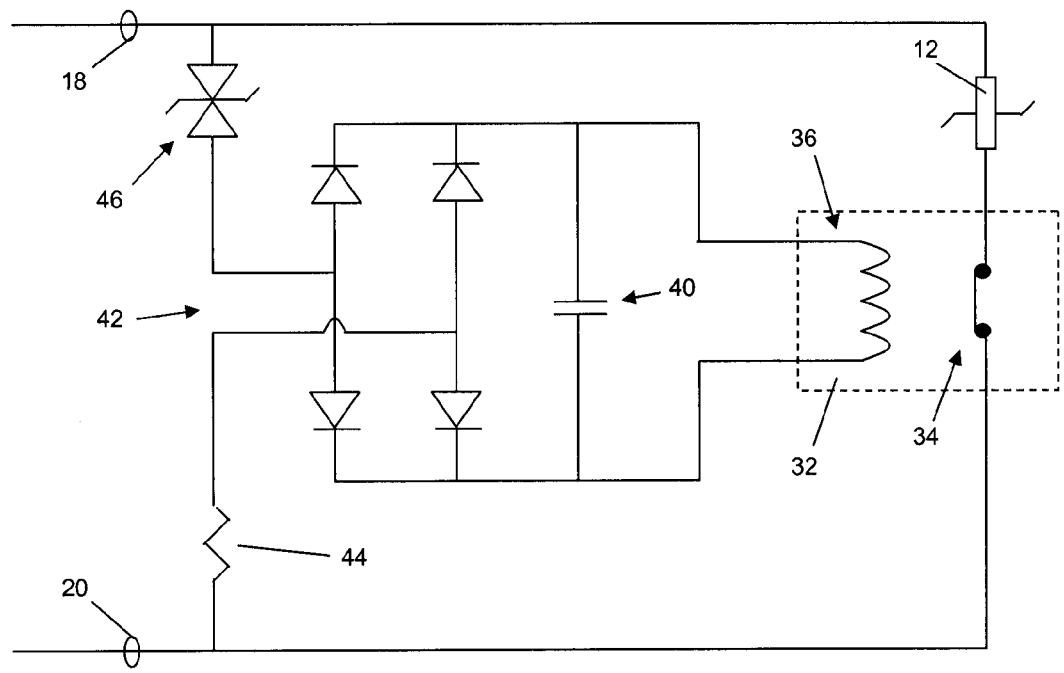
FIG. 3 illustrates a particular embodiment of a voltage sense circuit utilizing certain aspects of the present inventions.

Referring now to FIG. 3, a particular embodiment of the voltage sense circuit 16 utilizing certain aspects of the present inventions will now be described. This embodiment of the voltage sense circuit 16 is particularly useful in circuits having a line voltage, line to neutral, of approximately 120 volts. The voltage sense circuit 16 may include a capacitor 40 and a diode bridge 42 across the coil 36 of the relay 32. Inputs to the diode bridge 42 are wired across the line voltage through a resistor 44 and a bidirectional transient voltage suppression, or avalanche, diode 46.

Upon reaching the avalanche diode's 46 reverse breakdown voltage, plus twice the voltage drop of diodes from the diode bridge 42, fault current flows through the avalanche diode 46, diode bridge 42, and resistor 44. The fault current charges the capacitor 40 until the coil's 36 operating voltage is reached, at which time the relay 32 opens the contacts 34, taking the first device 12 off-line.

Thus, the trip level and the hysteresis of the voltage sense circuit 16 is determined by the operating voltage of the coil 36, the value of the capacitor 40, the value of the resistor 44, and the reverse breakdown voltage rating of the avalanche diode 46. The trip level is the value of the line voltage to be considered a sufficient voltage swell to trigger the voltage sense circuit 16. The hysteresis of the voltage sense circuit 16 determines a voltage swell duration at which the first and/or third devices 12,22 are taken off-line, as well as a reset duration at which the first and/or third devices 12,22 are placed back on-line.

Figure 4:
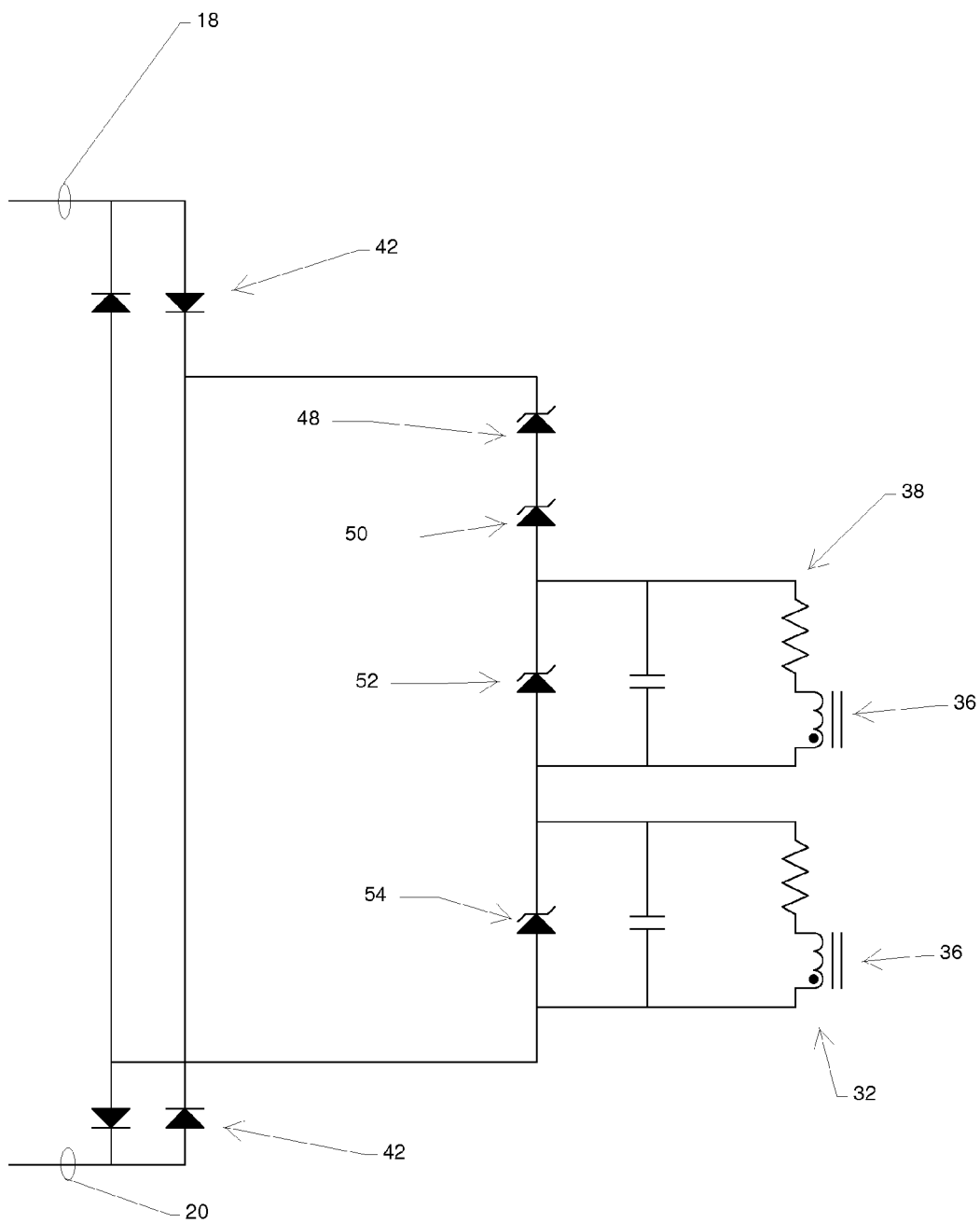
FIG. 4 illustrates another embodiment of the voltage sense circuit utilizing certain aspects of the present inventions.
Figure 5:
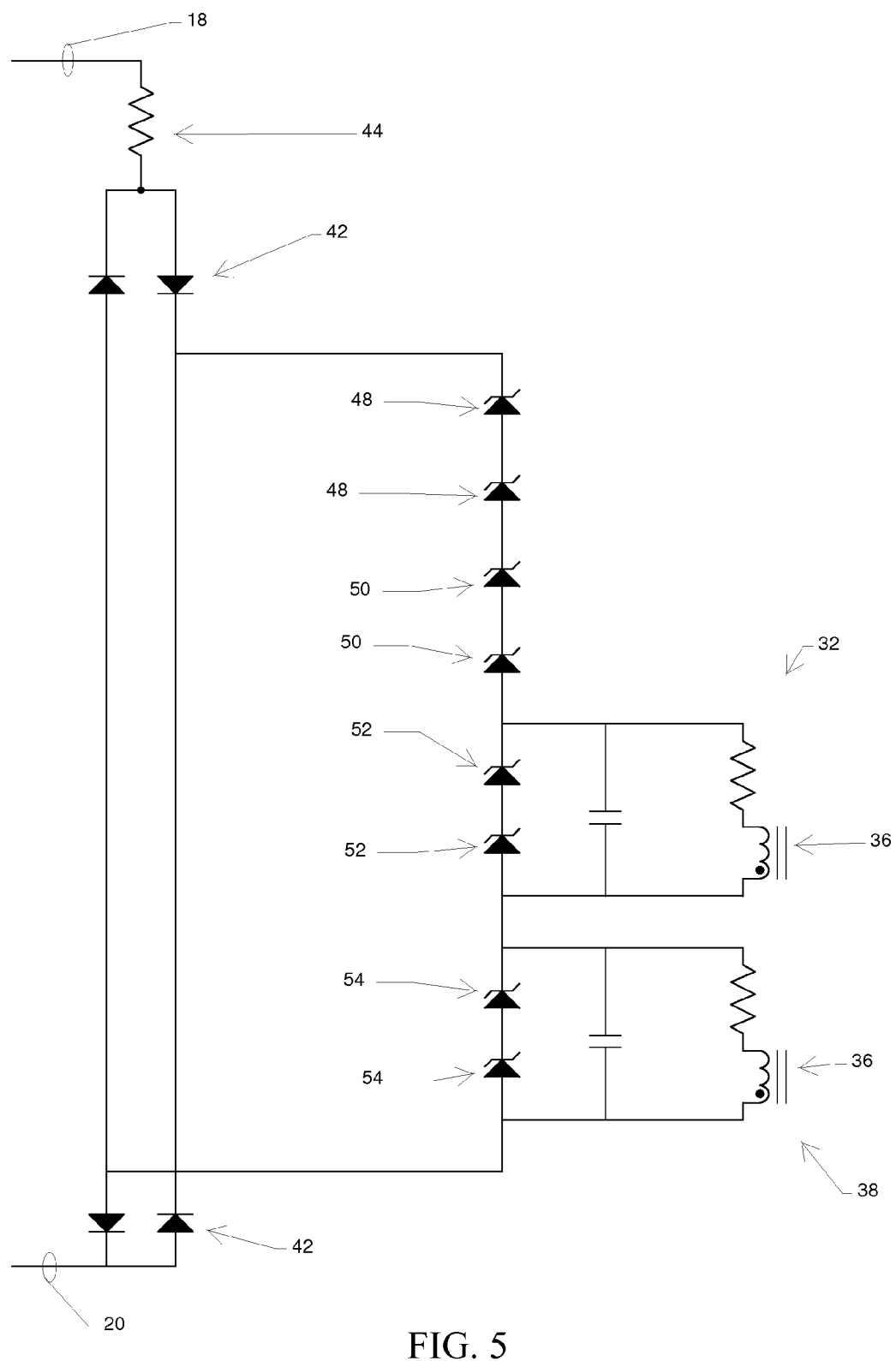
FIG. 5 illustrates another embodiment of the voltage sense circuit utilizing certain aspects of the present inventions.
Figure 6A:
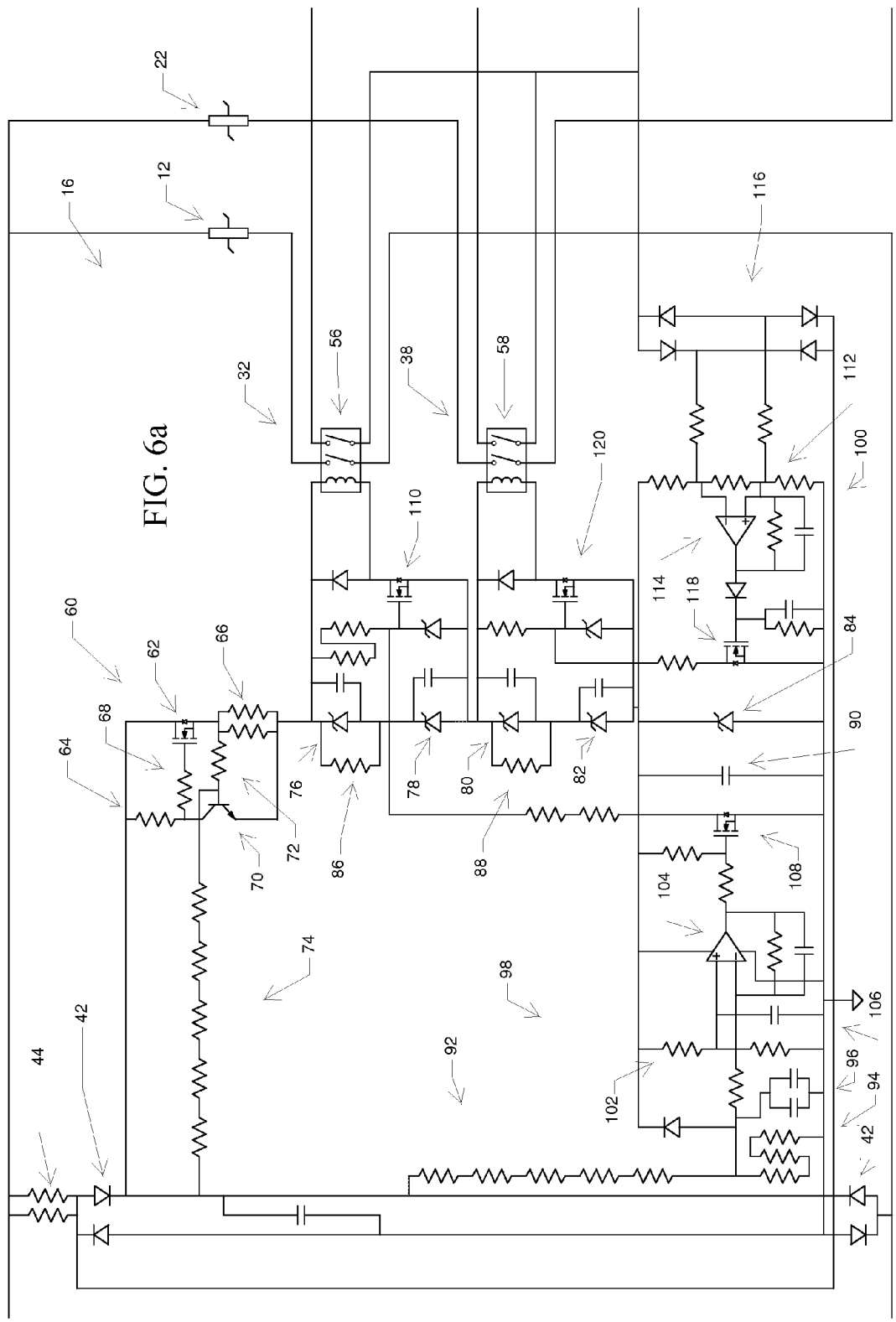
FIG. 6a illustrates another embodiment of the transient voltage surge suppressor assembly utilizing certain aspects of the present inventions.
Figure 6B:
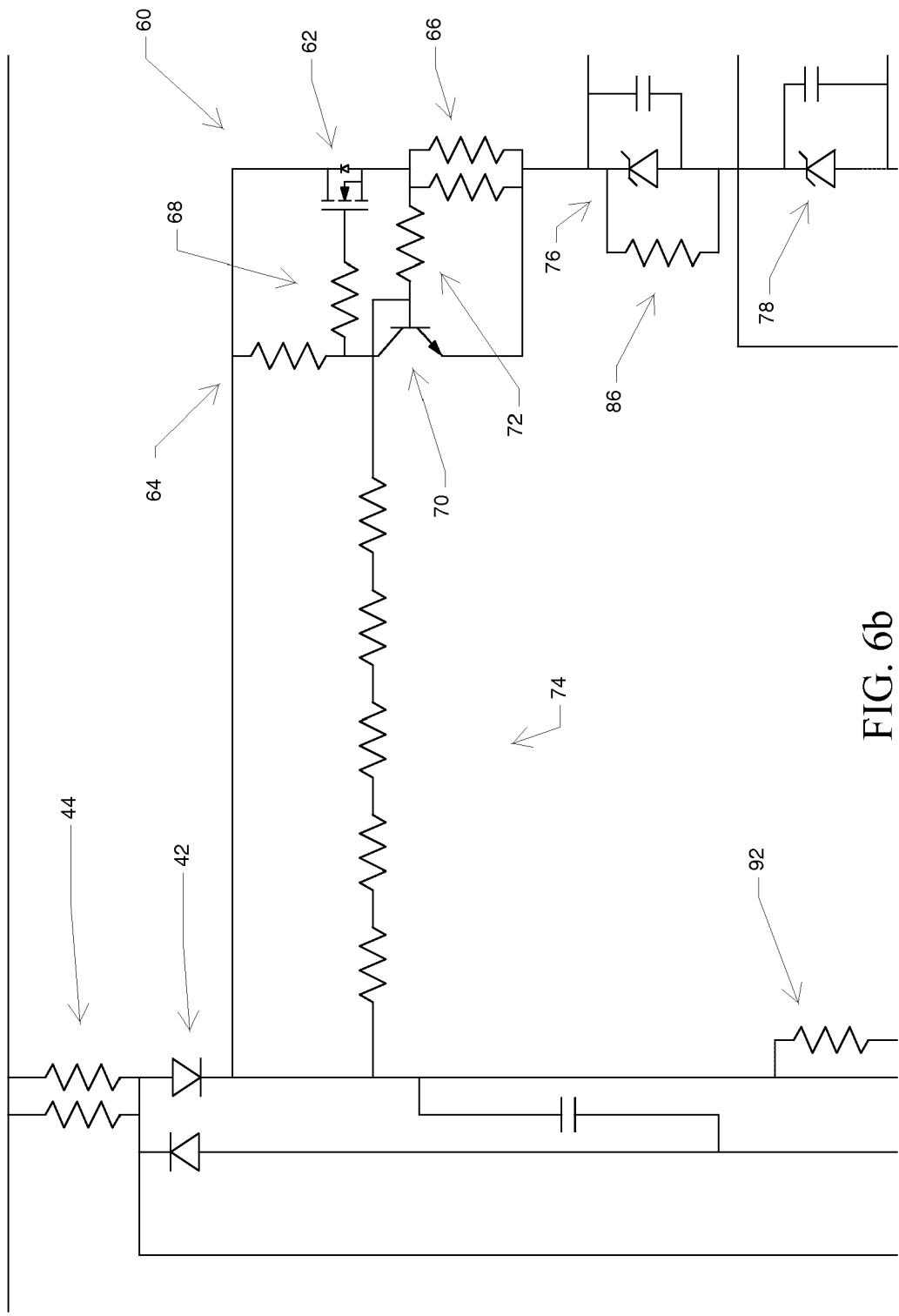
Figure 6C:
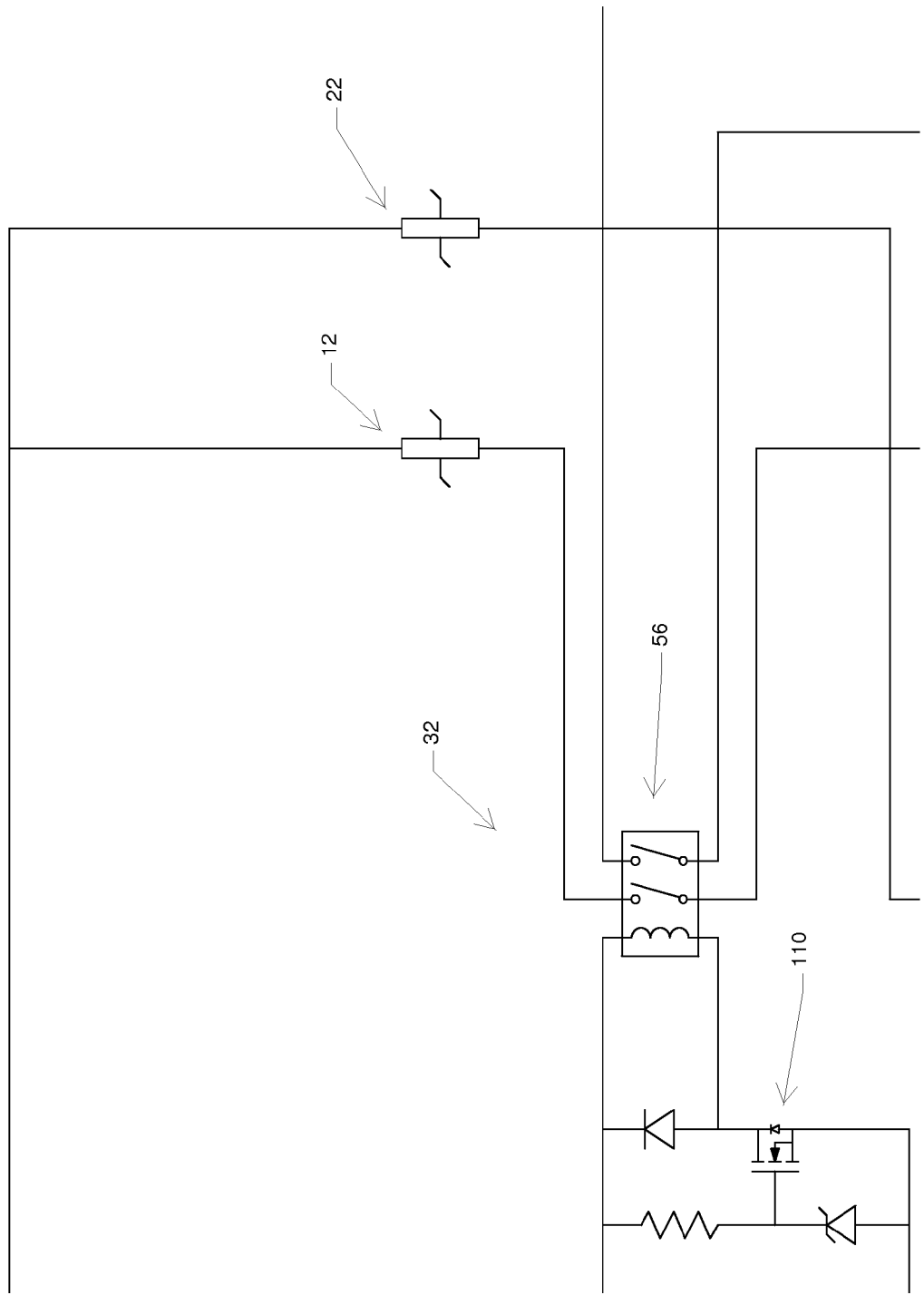
Figure 6D:
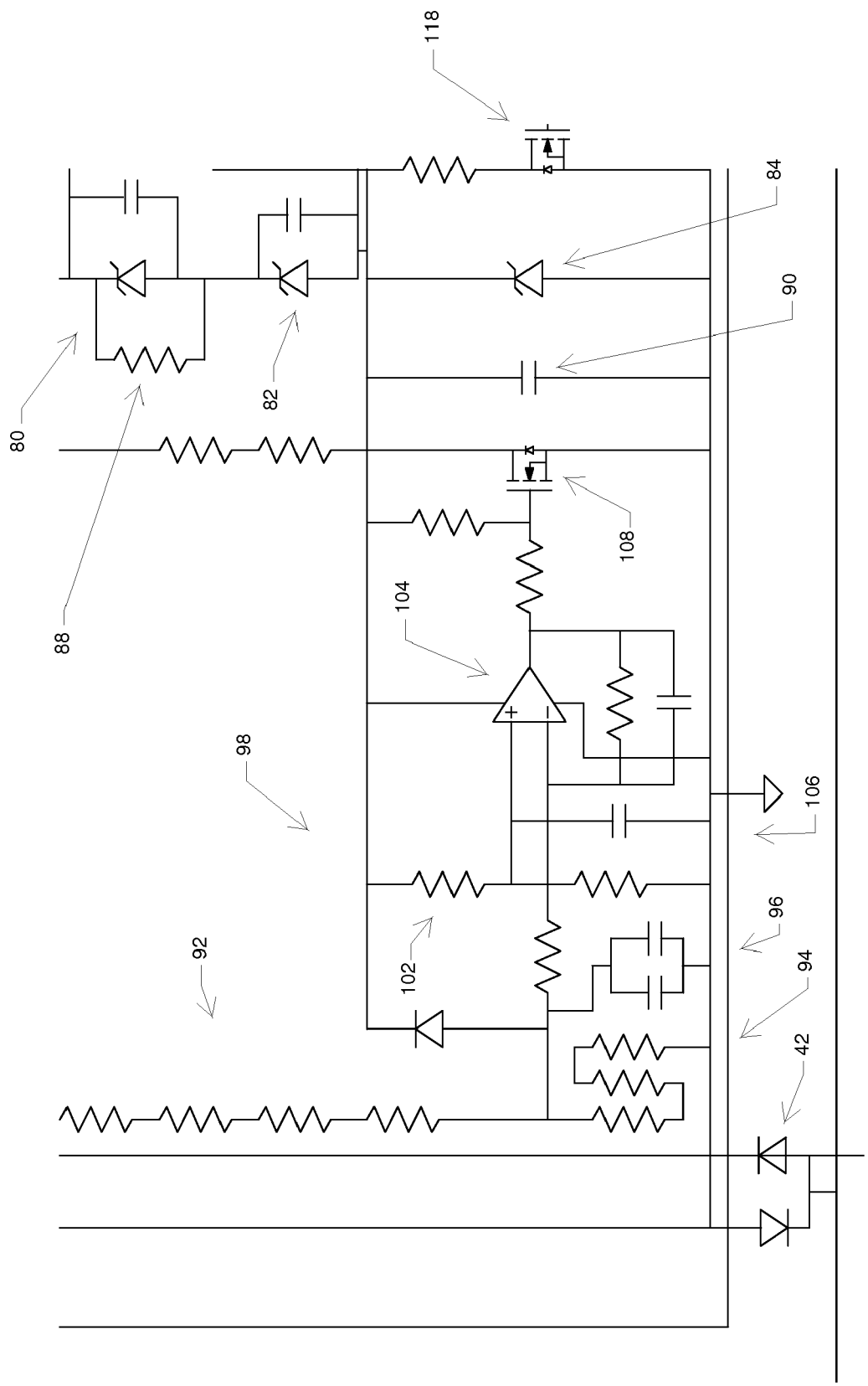

Referring now to FIG. 4, another embodiment of the voltage sense circuit 16 utilizing certain aspects of the present inventions will now be described. This embodiment of the voltage sense circuit 16 is similar to the previous embodiment, with some components relocated. This embodiment of the voltage sense circuit 16 is also configured to control two relays 32,38. The voltage sense circuit 16 of this embodiment, includes the capacitor 40 for each coil 36 of both relays 32,38 controlling the first and third devices 12,22. This embodiment of the voltage sense circuit 16 also includes the diode bridge 42 and may include the resistor 44 (as shown in FIGS. 3 and 5).

Rather than the bidirectional avalanche diode 46 of the previous embodiment, that functionality is provided by one or more zener diodes 48,50 downstream of the diode bridge 42. For example, once the line voltage reaches the reverse breakdown voltage of the zener diodes 48,50, plus twice the voltage drop of diodes from the diode bridge 42, fault current flows through the zener diodes 48,50, diode bridge 42, and resistor 44. The fault current charges each capacitor 40 until each coils' 36 operating voltage is reached, at which time the associated relay 32,38 opens the contacts 34, taking the first and/or third devices 12,22 off-line. Additional zener diodes 52,54 may be used to protect the coils 36 of the relays 32,38 from an overvoltage.

The trip level and the hysteresis of the voltage sense circuit 16 is determined by the operating voltage of the coils 36, the value of the capacitors 40, the value of the resistor 44, and the voltage rating of the zener diodes 48,50. Because the diode bridge 42 has already rectified the line voltage, these zener diodes 48,50 need not be configured for bidirectional operation. Thus, placement of the avalanche, or zener, diode(s) 46,48,50 may determine whether bi-directionality is required. The zener diodes 48,50,52,54 may or may not be identical. In one embodiment, the zener diodes 48,50,52,54 may be part number 1N4757A; the resistor 44 may be 4900 Ohms; the diode bridge 42 may comprise diodes of part number 1N4007; the capacitors 40 may be 10 µFarads; the relays 32,38 may have 1 Henry coils 36 and/or 5760 Ohm resistors; and the voltage sense circuit 16 may operate from 60 Hz 120 Volts Alternating Current (VAC).

It can also be seen, in FIG. 4, that the coils 36 of the relays 32,38 may be placed across different zener diodes 52,54. Because the coils 36, capacitors 40, and/or zener diodes 52,54 may be different, each relay 32,38 of the voltage sense circuit 16 may be configured to operate at a different trip level. Thus, the first and third devices 12,22 may be taken off-line, and/or placed back online, at different trip levels, voltage swells, voltage swell durations, and/or reset durations.

Referring now to FIG. 5, still another embodiment of the voltage sense circuit 16 utilizing certain aspects of the present inventions will now be described. This embodiment of the voltage sense circuit 16 is particularly useful in circuits having a line voltage, line to neutral, significantly greater than 120 volts. The voltage sense circuit 16, of this embodiment, includes the capacitor 40 for each coil 36 of both relays 32,38 controlling the first and third devices 12,22. This embodiment of the voltage sense circuit 16 also includes the diode bridge 42, the resistor 44, and pairs of zener diodes 48,50 downstream of the diode bridge 42.

The embodiment of FIG. 5 operates similarly to that of FIG. 4, with one difference being the pairing of the zener diodes 48,50. Because the zener diodes 48,50 are paired, higher trip levels, or voltage swells, may be accommodated. In one embodiment, the zener diodes 48,50,52,54 may be part number 1N4757A; the resistor 44 may be 36,000 Ohms; the diode bridge 42 may comprise diodes of part number 1N4007; the capacitors 40 may be 10 µFarads; the relays 32,38 may have 1 Henry coils 36 and/or 28,800 Ohm resistors; and the voltage sense circuit 16 may operate from 60 Hz 277 VAC.

Referring now to FIG. 6a through FIG. 6e, still another embodiment of the voltage sense circuit 16 utilizing certain aspects of the present inventions will now be described. This embodiment of the voltage sense circuit 16 also controls two relays 32,28. However, this embodiment provides for a linear controlled current flow through the coils of the relays 32,38. This embodiment also provides for reporting of operation of the relays 32,38, by including a separate set of contacts 56,58 for each relay 32,38.

This embodiment of the voltage sense circuit 16 also utilizes a lower supply voltage, such as 5 volts, 12 volts, 15 volts, or 48 volts. More specifically, the voltage sense circuit 16 includes a 15 volt linear current source to power certain functionality of the voltage sense circuit 16 and/or the relays 32,38. In the previous embodiments, the voltage sense circuit 16 is powered by a resistive-type supply that uses current, and therefore power, on the scale of the line voltage squared ($V^2$). The linear current supply of this embodiment of the voltage sense circuit 16 uses current, and therefore power, on the scale of the line voltage (V), which may provide a considerable power savings at higher line voltages.

Additionally, this embodiment of the voltage sense circuit 16 allows for more precise and consistent selection of the trip level and hysteresis, thereby better controlling the duration at which the first and/or third devices 12,22 are taken off-line and placed back on-line. This embodiment of the voltage sense circuit 16 also provides for separate line to ground monitoring and thereby separate control of the third device 22.

More specifically, parallel resistors 44 protect the diode bridge 42 during a high change in voltage over time, such as when first engaging the assembly 10. The diode bridge 42 is used to full wave rectify the input voltage so all downstream components need only be concerned with a single polarity. In one embodiment, the resistors 44 may be 100 Ohms.

Some embodiments may include an integral power supply 60. One embodiment of the integral power supply 60 may include a constant current source comprising a transistor, such as a MOSFET, 62 and resistors 64,66. Another resistor 68 may be used to increase stability of the transistor 62. As the current increases, current through parallel resistors 66 causes an increased voltage across the base-emitter junction of bi-polar junction transistor 70. Current into the base-emitter junction is limited by resistor 72, thereby ensuring circuit stability. Series resistors 74 control, or limit, the current output of the integral power supply 60 as the rectified input voltage increases. In one embodiment, the resistor 64 may be 1,000,000 Ohms; the resistor 66 may be 27 Ohms and 1,000 Ohms in parallel; the resistor 68 may be 1,000 Ohms; and the resistor 72 may be 3,900 Ohms.

Current from the integral power supply 60 flows through zener diodes 76,78,80,82,84. Resistors 86,88 may or may not be used to accommodate a 48V relay coil for lower voltage operation or a higher voltage coil for higher voltage operation. Voltage across zener diode 84 is smoothed by a capacitor 90 at the DC voltage, which may be approximately 15 VDC in the depicted embodiment. In one embodiment, the resistors 86,88 may be 10 Ohms and the capacitor 90 may be 10 µFarads.

A resistor divider circuit, made up of top resistors 92 and bottom resistors 94 may be used as a sense voltage smoothed by capacitors 96. The capacitors 96 may allow fast transients to pass undetected by the voltage sense circuit 16 while still clamping true transient voltages. In one embodiment, the top resistors 92 may all be 100,000 Ohms; the bottom resistors 94 may be 20,000, 3,900, and 2,000 Ohms; and the capacitors 96 may be 1 µFarad.

In the embodiment shown, there are two independent voltage trigger circuits, a first voltage trigger circuit 98 for line to neutral and a second voltage trigger circuit 100 for line to ground. The first voltage trigger circuit 98 uses the sense voltage from the resistor divider circuit compared to a resistor divider 102 via a comparator 104. A capacitor 106 smoothes the resistor divider 102 voltage to near direct current (DC). The comparator 104 drives a transistor 108, which in turn drives a transistor 110 that controls the relay 32. Additional resistors and capacitors may be used to control hysteresis to clean the resultant signal and ultimately keep the relay contacts 56 from chattering. In one embodiment, the resistor divider 102 may comprise 100,000 Ohm resistors and the comparator 104 may be part number LM393.

The second voltage trigger circuit 100 may be identical, or may be a modified version. For example, the second voltage trigger circuit 100 may include a different resistive network 112 that applies bias voltages to a comparator's 114 inputs from a diode bridge 116. Ground and/or Neutral inputs may feed small currents through the diode bridge 116 into the resistor network 112. The comparator 114 drives a transistor 118, which in turn drives a transistor 120 that controls the relay 38. Again, additional resistors and capacitors may be used to control hysteresis to clean the resultant signal and ultimately keep the relay contacts 58 from chattering. In one embodiment, the resistive network 112 may comprise 100,000 and 1,000,000 Ohms resistors and the comparator 114 may be part number LM393.

As discussed above, it can be seen that the different relays 32,38 may be tripped at different voltages. For example, the first device 12 may be taken off-line through relay 32, depending on the characteristics of the components in the first voltage trigger circuit 98. Similarly, the third device 22 may be taken off-line through relay 38, depending on the characteristics of the components in the second voltage trigger circuit 100. These components may be nearly identical, thereby providing nearly identical operation with respect to the first and third devices 12,22. Alternatively, these components may be different, thereby providing different operation with respect to the first and third devices 12,22. Additionally, these components may be dependent and/or related, such that their operation with respect to the first and third devices 12,22 is dependent and/or related. For example, the voltage sense circuit 16 may be configured to ensure that the first device 12 always trips (or is taken off-line) before, or at a lower voltage than, the third device 22, or vice versa. Similarly, the voltage sense circuit 16 may be configured to ensure that the first device 12 is placed back on-line before, or at a higher voltage than, the third device 22, or vice versa. Alternatively, these components may be completely independent, such that their operation with respect to the first and third devices 12,22 is independent.

It can further be seen that the voltage sense circuit 16 may monitor the voltage between the line 18 and the neutral 20 and control the first device 12, which is also between the line 18 and the neutral 20. It can also be seen that the voltage sense circuit 16 may monitor the voltage between the line 18 and the ground 26 and control the second device 22, which is also between the line 18 and the ground 26. In some embodiments, the voltage sense circuit 16 may also control the third device 22, between the line 18 and the ground 26, while monitoring only the voltage between the line 18 and the neutral 20, or vice versa.

Figure 7:
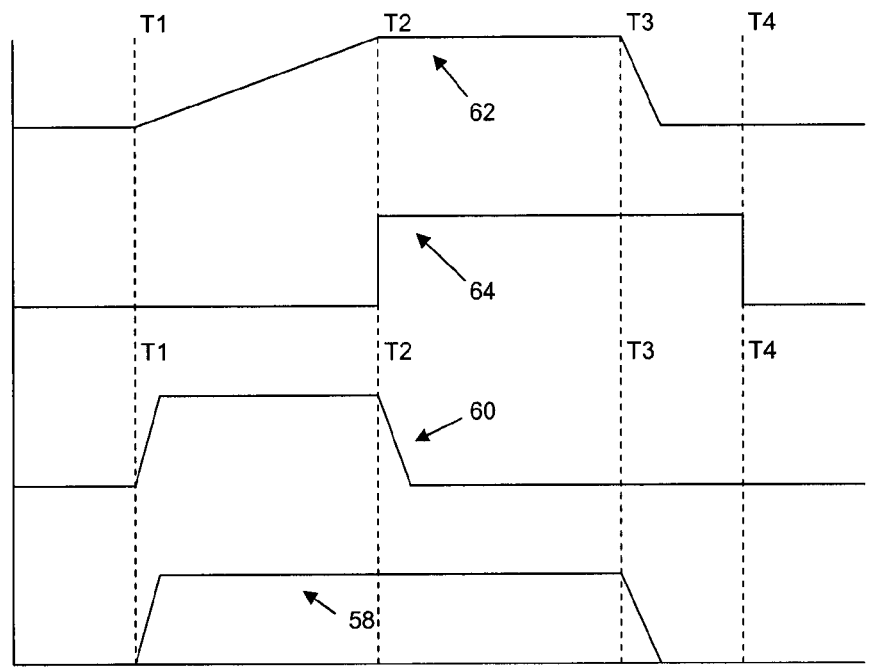
FIG. 7 illustrates a simplified timing diagram of the transient voltage surge suppressor assembly utilizing certain aspects of the present inventions.

Referring now to FIG. 7, timing and operation of the assembly 10 will now be described. At T1, the line voltage 58 rises well beyond normal operational levels, indicative of a transient voltage surge, or voltage swell. The first device 12 immediately reacts and the energy dissipated across the first device 12 tracks the voltage swell, as indicated by curve 60. As shown the voltage swell is of a relatively long duration. Such a long duration may have harmful effects on the first device 12, as the first device 12 may be more sensitive, faster acting, have a lower clamping voltage, and/or include fewer/smaller components than the second device 14. It can be seen that the second device 14 may react more slowly, as shown by curve 62.

However, in one embodiment, by T2, the second device 14 has come on-line and is dissipating the fault energy. Therefore, at T2, the voltage sense circuit 16 triggers the relay 32, as shown by curve 64. Thus, at T2, the contacts 34 open and the capacitor 30 quickly charges reducing the energy dissipated across the first device 12. After T2, with the first device 12 taken off-line, the second device 14 continues to dissipate the fault energy.

At T3, the voltage swell subsides, as shown by curve 58. Thereafter, at T4, the voltage sense circuit 16 resets the relay 32, thereby placing the first device 12 back on-line and ready to quickly react to another voltage swell. The time between T1 and T3 may therefore be referred to as the voltage swell duration, at the passage of which the assembly 10 will take the first and/or third device 12,22 off-line. The time between T3 and T4 may be referred to as the reset duration, at the passage of which the assembly 10 will place the first and/or third device 12,22 back on-line. As discussed above, the voltage swell duration(s), the reset duration(s), and the trip level(s) are determined by the components of the voltage sense circuit 16.

It should be understood that the diagram of FIG. 7 is a simplified timing diagram meant to illustrate the operation and functionality of the present inventions. For example, while the curves 58,60,62,64 are depicted as straight lines, the curves would be expected to exhibit curvatures, such as exponential curves, spikes, and/or other non-linearities in actual practice.

Referring now to FIG. 8, the voltage sense circuit 16 may be equipped with an energy monitor capability that sums up energy dissipated by the first energy absorbing device 12. For example, as discussed above, the voltage sense circuit 16 may be connected across the line 18 and the neutral 20 via lines 122, thereby monitoring a voltage across device 12. The voltage sense circuit 16 may also include a current sense line 124 to monitor a current into the device 12. The energy into clamping component 12 may be derived as the voltage multiplied by current integrated over time. Such configuration may provide a more accurate information as to how much energy the first device 12 can absorb before being taken off line.

In any case, it can be seen that the transient voltage surge suppressor assembly 10 of the present invention may react quickly and sensitively to the voltage swell, such as by using a more sensitive and/or fast acting first energy absorbing device 12. The assembly 10 may also sustain transient voltage surge suppression through a long duration voltage swell, that might otherwise damage a more sensitive and/or fast acting energy absorbing device, by taking the first device 12 off-line and relying on the more robust second energy absorbing device 14.

Other and further embodiments utilizing one or more aspects of the inventions described above can be devised without departing from the spirit of Applicant's invention.

For example, the trip level and the hysteresis of the voltage sense circuit 16 may be dependent and/or completely independent. For example, a higher line voltage may result in a shorter duration, at which time the first and/or third devices 12,22 are taken off-line. Additionally, while a single phase has been described, the assembly 10 may be independently duplicated for multiple phases. Alternatively, the assembly 10 may be modified to accommodate multiple phases with some interaction and/or dependency. For example, the assembly may be adapted to protect line to line voltages, handling line to line transient voltages. Similarly, the assembly 10, or portions thereof, may be duplicated for each line to neutral, line to ground, and/or line to line. This would allow dependent and/or independent control of multiple energy absorbing devices across each line to neutral and/or line to ground. Each device, as described above, may actually comprise multiple energy absorbing components operating together. Further, the various methods and embodiments of the invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. For example, select functionality described with one embodiment may be incorporated into any other embodiment. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A transient voltage surge suppressor assembly comprising:
    a first energy absorbing device wired between a line and a neutral;
    a relay configured to selectively create a short circuit thereby placing the first device on-line and selectively create an open circuit thereby taking the first device off-line;
    a second energy absorbing device wired between the line and the neutral in parallel with the first device, the second device having a higher clamping voltage than the first device; and
    a voltage sense circuit configured to detect a voltage swell and cause the relay to take the first device off-line when the voltage swell lasts for at least a predefined duration.

2. The assembly as set forth in claim 1, the assembly further comprising a third energy absorbing device wired between the line and a ground, the third device being configured to be taken off-line if the voltage swell lasts for the duration.

3. The assembly as set forth in claim 1, wherein the voltage sense circuit is powered by a line voltage between the line and the neutral.

4. The assembly as set forth in claim 1, wherein the voltage sense circuit is powered by a supply voltage less than a line voltage between the line and the neutral.

5. The assembly as set forth in claim 1, wherein the voltage sense circuit is further configured to place the first device on-line after the voltage swell subsides.

6. A transient voltage surge suppressor assembly comprising:
    a first energy absorbing device;
    a second energy absorbing device in parallel with the first device; and
    a voltage sense circuit configured to take the first device off-line when a voltage swell lasts for at least a predetermined duration.

7. The assembly as set forth in claim 6, further including a relay in series with the first device and opened by the voltage sense circuit when the voltage swell lasts for the duration.

8. The assembly as set forth in claim 6, further including an impedance in series with the first device.

9. The assembly as set forth in claim 6, wherein the first and second devices are wired in parallel between a line and a neutral.

10. The assembly as set forth in claim 6, wherein the first and second devices are wired in parallel between a line and a ground.

11. The assembly as set forth in claim 6, wherein the first and second devices are wired in parallel between a line and a neutral, the assembly further comprising a third energy absorbing device wired between the line and a ground, the third device being configured to be taken off-line when the voltage swell lasts for the duration.

12. The assembly as set forth in claim 6, wherein the first and second devices are wired in parallel between a line and a neutral and the voltage sense circuit is powered by a line voltage between the line and the neutral.

13. The assembly as set forth in claim 6, wherein the first and second devices are wired in parallel between a line and a neutral and the voltage sense circuit is powered by a supply voltage less than a line voltage between the line and the neutral.

14. The assembly as set forth in claim 6, wherein the voltage sense circuit is powered by a voltage selected from the group consisting of 5 volts, 12 volts, 15 volts, and 48 volts.

15. The assembly as set forth in claim 6, wherein the voltage sense circuit is further configured to place the first device on-line after the voltage swell subsides.

16. The assembly as set forth in claim 6, wherein the first device is more sensitive than the second device.

17. The assembly as set forth in claim 6, wherein the first device has a lower clamping voltage than the second device.

18. The assembly as set forth in claim 6, wherein the first device is smaller than the second device.

19. The assembly as set forth in claim 6, wherein the first device includes fewer components than the second device.

20. The assembly as set forth in claim 6, wherein one or more of the energy absorbing devices are silicon avalanche diodes.

21. The assembly as set forth in claim 6, wherein the first device includes multiple energy absorbing components operating together.

22. The assembly as set forth in claim 6, wherein the first and second devices are wired in parallel between a first line and a neutral, the assembly further comprising a third energy absorbing device wired between a second line and the neutral.

23. The assembly as set forth in claim 6, wherein the first and second devices are wired in parallel between a first line and a second line.

24. A transient voltage surge suppressor assembly comprising:
    a first energy absorbing device;

a second energy absorbing device in parallel with the first device; and a power sense circuit configured to take the first device off-line when the first device has absorbed its energy absorbing limit.

25. The assembly as set forth in claim 24, wherein the first and second devices are wired in parallel between a first line and a neutral.

26. The assembly as set forth in claim 24, wherein the first and second devices are wired in parallel between a first line and a second line.

27. A transient voltage surge suppressor assembly comprising:

a first energy absorbing device;

a first capacitive element wired in series with the first device, wherein the first device and the first capacitive element are wired between a line and a neutral;

a first pair of relay contacts wired across the first capacitive element, wherein the first relay contacts form a portion of a first relay, the first relay being configured to create a short circuit across the first capacitive element thereby placing the first device on-line, the first relay being further configured to create an open circuit across the first capacitive element thereby taking the first device off-line;

a second energy absorbing device connected to the line;

a second capacitive element wired in series with the second device, wherein the second device and the second capacitive element are wired between the line and a ground;

a second pair of relay contacts wired across the second capacitive element, wherein the second relay contacts form a portion of a second relay, the second relay being configured to create a short circuit across the second capacitive element thereby placing the second device on-line, the second relay being further configured to create an open circuit across the second capacitive element thereby taking the second device off-line;

a third energy absorbing device wired between the line and the neutral in parallel with the first device, the third device having a higher clamping voltage than the first device;

a voltage sense circuit configured to detect a voltage swell and take the first and second devices off-line when the voltage swell lasts for a duration and place the first and second devices on-line in the absence of the voltage swell.

28. The assembly as set forth in claim 1, wherein the second energy absorbing device is configured to come on-line if the voltage swell lasts for at least the predefined duration.

29. The assembly as set forth in claim 6, wherein the second energy absorbing device is configured to come on-line if the voltage swell lasts for at least the predetermined duration.

30. The assembly as set forth in claim 24, wherein the second energy absorbing device is configured to come on-line if the first device has absorbed its energy absorbing limit.

* * * * *